US008001596B2

(12) United States Patent
Wollnik et al.

(10) Patent No.: US 8,001,596 B2
(45) Date of Patent: Aug. 16, 2011

(54) SOFTWARE PROTECTION INJECTION AT LOAD TIME

(75) Inventors: Matthias Wollnik, Seattle, WA (US); Nir Ben Zvi, Redmond, WA (US); Hakki Tunc Bostanci, Redmond, WA (US); John Richard McDowell, Seattle, WA (US); Aaron Goldsmid, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 924 days.

(21) Appl. No.: 11/743,755

(22) Filed: May 3, 2007

(65) Prior Publication Data

US 2008/0276314 A1    Nov. 6, 2008

(51) Int. Cl.
*G06F 11/00* (2006.01)
(52) U.S. Cl. ........... 726/22; 726/23; 726/24; 726/25; 726/26; 726/27; 726/28; 726/29; 726/30; 726/31; 726/32; 726/33; 713/189; 713/193
(58) Field of Classification Search ........... 726/22–33; 713/189, 193
See application file for complete search history.

(56) References Cited

U.S. PATENT DOCUMENTS

| | | | | |
|---|---|---|---|---|
| 5,056,009 A | | 10/1991 | Mizuta | 364/200 |
| 5,359,659 A | * | 10/1994 | Rosenthal | 726/24 |
| 6,023,763 A | | 2/2000 | Grumstrup et al. | 713/200 |
| 6,044,469 A | * | 3/2000 | Horstmann | 726/29 |
| 6,463,538 B1 | | 10/2002 | Elteto | 713/190 |
| 6,523,119 B2 | | 2/2003 | Pavlin et al. | 713/192 |
| 7,093,132 B2 | | 8/2006 | Aho et al. | 713/176 |
| 2003/0217280 A1 | | 11/2003 | Keaton et al. | 713/193 |
| 2003/0233564 A1 | | 12/2003 | LaRose et al. | 713/193 |
| 2005/0198516 A1 | * | 9/2005 | Marr | 713/187 |
| 2007/0266434 A1 | * | 11/2007 | Reifer | 726/22 |

FOREIGN PATENT DOCUMENTS

EP    0 191 162 A2    8/1986

OTHER PUBLICATIONS

Handbook of Applied Cryptography by Menezes et al; Year: 1997; Publisher: CRC Press.*
Erlingsson, U. et al., "XFI:Software Guards for System Address Spaces", http://research.microsoft.com/users/mbudiu/osdi06.pdf, 14 pages.
Nanda, S. et al., "Foreign Code Detection on the Windows/X86 Platform", http://www.acsac.org/2006/papers/86.pdf, 10 pages.
Hu, W. et al., "Secure and Practical Defense Against Code-Injection Attacks using Software Dynamic Translation", *VEE*, 2006, http://www.cs.virginia.edu/papers/p2-hu.pdf, 2-12.

* cited by examiner

*Primary Examiner* — Taghi T Arani
*Assistant Examiner* — Madhuri Herzog
(74) *Attorney, Agent, or Firm* — Woodcock Washburn LLP (57) ABSTRACT

A method to apply a protection mechanism to a binary object includes using operating system resources to load a binary object from a storage medium along with a manifest and a digital signature. Authentication of the binary object is performed using the digital signature and the manifest is read to determine a category of protection for the binary object. The operating system selects a protection mechanism corresponding to the protection category and injects protection mechanism code, along with the binary object into a binary image on computer RAM. When the binary image is accessed, the protection mechanism executes and either allows full access and functionality to the binary object or prevents proper access and operation of the binary object. The protection mechanisms may be updated independently from the information on the storage medium.

18 Claims, 4 Drawing Sheets

SOFTWARE PROTECTION INJECTION AT LOAD TIME

BACKGROUND

The protection of software has many aspects. Some software applications are augmented to detect tampering to avoid malfunctions of the software and to prevent malicious use. Tampering can include the modification of functional modules or the introduction of a virus or other forms of malware. Other software applications can include protections to detect the use of a debugger to prevent a reverse engineering of the software. A debugger can be useful to someone who wishes to discover the functionality of a software application or to modify the application for malicious purposes. Other software may include various verifications to ensure the integrity or authenticity of the software application. Traditionally, a software developer generates protection against tampering, against the use of debuggers, against reverse engineering, and the like, by generating these protections during the software creation process. As such, the protections are fixed and are immutable in the binary image on a software storage device, such as compact disk. As a result, a malicious entity has a static target to attack. Such a static target, even if expertly conceived and executed, can over time be successfully attacked, reverse engineered, and copied or modified without the permission of the original software developer. The present invention addresses these concerns and others.

SUMMARY

In one aspect of the invention, a list of protection categories is stored in a manifest on a storage medium as part of a binary object. The manifest is read by an operating system (OS) and a protection mechanism is identified. Code corresponding to the protection mechanism is injected into an image in computer memory of the binary object. When executed, the binary image of the binary object also executes the code of the protection mechanism which serves to apply protection verifications upon the binary object. Based on the operation of the protection mechanism, access or functionality of the binary object is granted or denied. The protection mechanisms are updateable separately from of the manifest.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Exemplary Embodiments

In one aspect of an embodiment, the static protection nature of a binary program stored on a storage media is changed to involve a more flexible protection that is provided via an operating system (OS). In one example embodiment, the OS provides the protection mechanisms that a stored media binary program requires. This protection can be applied by the OS when the binary is loaded into memory. The OS can inject any number of updatable protection mechanisms that fulfill the requirements of the binary program on a storage medium when it accesses or loads the binary into computer memory. Since protection mechanisms can be selected at random, loading the same binary twice, loading it on two identical machines, or loading it on two different hardware configurations, could result in different protections injected into the final binary image.

This approach has the advantages of a dynamically changing target for hackers and the flexibility to apply new protection technologies on software that was released before the protection technology was created. Thus, updates to the protection mechanisms can be received by the OS and applied to a loaded software binary program even though the storage media containing the program was manufactured and distributed far earlier in time than the updated protection mechanism. Another additional advantage is that the distribution of software without protection mechanisms pre-built into the binary can ease software development and testing for product teams involved with the software program because the protection mechanism is not hard-coded into the software product on the storage medium.

Figure 1A:
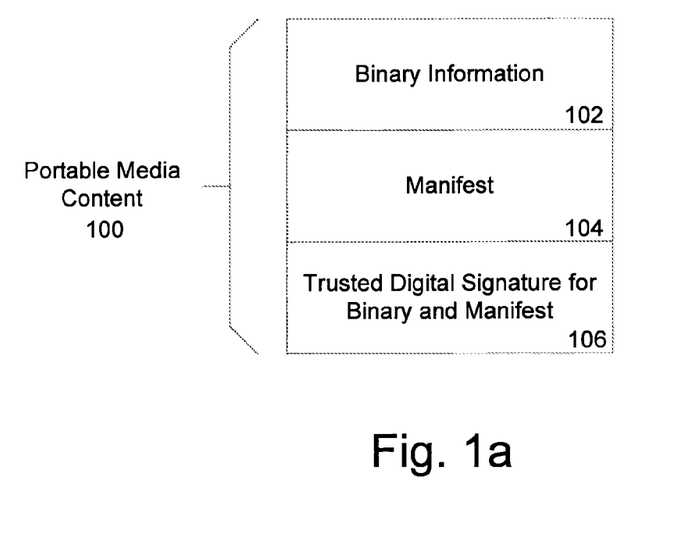
FIG. 1a is a block diagram showing an example content of portable storage media according to one embodiment.

FIG. 1a depicts an example assembly of information on a portable storage medium 100. Such portable media may be in the form of magnetic media, such as a floppy or removable hard drive, or optical media such as a CD or DVD. In FIG. 1, binary information 102 represents the digital information that is to be protected on the media 100. Such binary or digital information 102 may be an executable program, a data file, or any other digital information that is desirable to store on the media and protect from efforts to change or copy. The binary information 102 may also be considered a digital or binary object. The manifest 104 is also digital information, but the manifest is a list of protection types or protection categories that are desirable to apply to the binary information 102. In a specific example, the manifest may be any or all of the following categories: anti-debugging, call verification, program identity checks, system integrity checks, license verifications, server inquiries, and deny-access via X mechanism, where X is a load, file open, or any other type of file access permitted using a computer.

A trusted digital signature 106, which covers the binary information 102 and the manifest 104 is also provided on the portable media 100. The digital signature is used to prevent on-disk tampering of the binary or manifest information when the portable media is read into a computer system using an operating system (OS) loader. The signature of the binary and manifest guarantees that the binary was not modified before the OS opens it. The applied protections then protect the binary information 102 when it is loaded into computer memory, such as random access memory (RAM). In general, computer memory can be random access memory that is external or internal to the CPU.

Figure 1B:
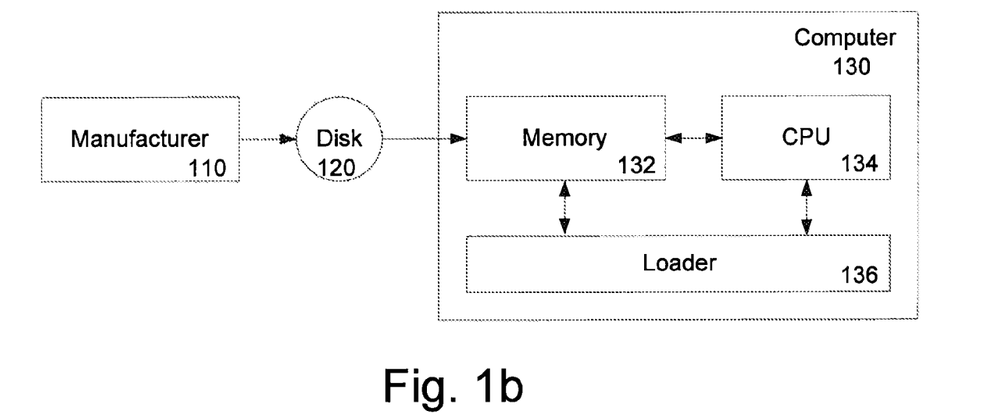
FIG. 1b is a simple block diagram showing an example product flow and use according to one embodiment.

FIG. 1b depicts a flow of the protection applied to the binary information 102 according to one embodiment. Initially, a manufacturer 110 generates portable computer-readable media disk 120 having the binary information 102, a manifest 104, and the trusted digital signature 106. The disk 120 is loaded into the computer 130 using a loader 136. The loader 136 loads the content of the disk into computer memory 132. According to an aspect of the invention, the manifest 104 of the disk 120 is read and interpreted by the CPU 134. The loading process essentially places protection mechanisms corresponding to the categories of the manifest into the digital image that is placed into computer memory 132. Thus, the protection mechanisms specified by the manifest become integrated into the digital image of the loaded binary information that is placed into computer memory 132. From there, any execution of the digital or binary image within computer memory includes execution of the protection mechanisms along with the binary information 102 that was contained on the disk 120. After loading the binary information 102 into computer memory 132, the resultant in-memory binary image is different from the original image on disk. But, the in-memory binary image has equivalent functionality with the added software protections afforded by the protection mechanisms that were inserted into the in-memory binary image during the loading process that correspond to the manifest protection categories.

Figure 2:
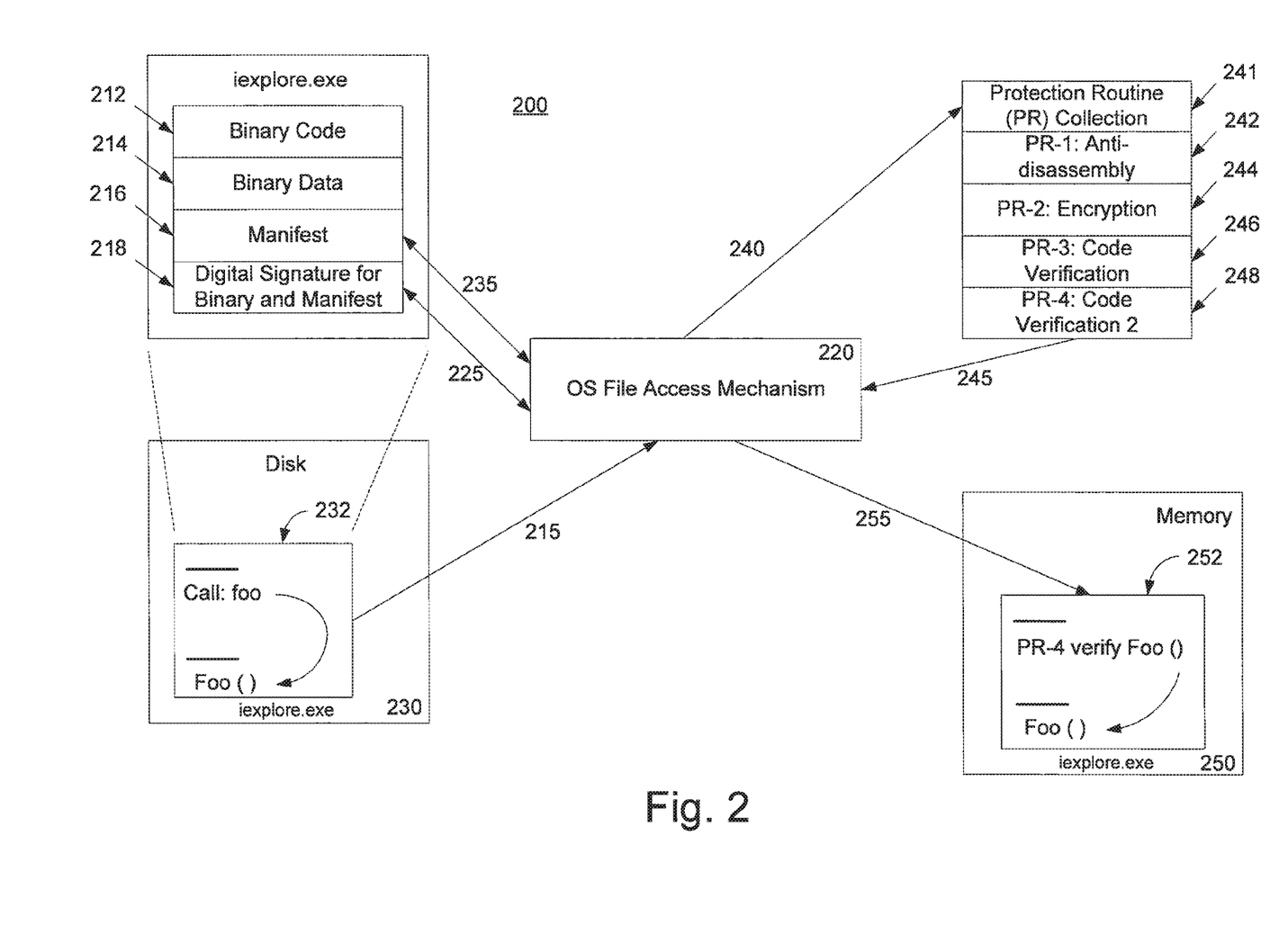
FIG. 2 is an example block diagram depicting a flow of information in a computer system according to aspects of the invention.

FIG. 2 depicts an example block diagram of data flow and events using an example loading of a disk with an Internet Explorer program stored on a portable media, such as a compact disk read only memory (CD ROM). In FIG. 2, the CD ROM 230 contains an iexplore.exe program 232. The content of the CD ROM is represented as digital or binary code 212 and associated binary data 214. A manifest 216 is also included on the CD ROM as is digital signature 218 for the binary information and manifest.

Initially, the disk 230 is loaded 215 into a computer having an OS file access mechanism, such as a CD ROM drive coupled with an OS loader. The OS loader responds to the CD ROM drive and begins to read the disk 230. The loader looks for the presence of a digital signature on the disk 230 which it uses to verify 225 the validity or authentication of the binary information 212, 214, and the manifest 216 (if present). If a manifest is present, a digital signature is required to load a binary. However, a digital signature may be present without a manifest. Here, it is assumed that a manifest and a digital signature are present. If the OS cannot authenticate the binary information and the manifest with the digital signature, then the binary information fails to load into computer memory. If the manifest is empty, then loading of the binary information on the disk into computer memory can continue normally.

Assuming the digital signature assists in authentication of the binary information and the manifest, then the loader reads 235 the manifest portion of the disk 230 to determine which category type of protection to include. The OS loader selects 240 which protection mechanism to use based the expressed protection category type in the manifest. The OS loader accesses a protection routine collection 241 to select the appropriate protection routine corresponding to the protection category type specified in the manifest. Essentially, the loader selects the protection routines from a collection of available algorithms. This PR collection 241 is organized into protection categories. This makes it easier to manage for updates and revocations. An updated protection mechanism can include a revocation of a previous protection mechanism. For example, when a method has been breached it can be removed from the list of protections used. Also, when a new threat is discovered and a new protection is developed, the collection of protection routines can be updated in the OS providing new protection mechanisms. These updates can occur periodically or can occur as needed or randomly. The advantage is that the disk 230 does not have to be updated for new protection mechanisms to be implemented to protect the binary information or object on the disk.

As an example of protection routines, the protection category or type can be any one or more of anti-debugging, call verification, program identity checks, system integrity checks, license verifications, server inquiries, and deny-access via X mechanism, where X is a load, file open, or any other type of file access permitted using a computer. In the example of FIG. 2, protection routine one (PR-1) is an anti-disassembly 242 routine, PR-2 is encryption 244 routine, PR-3 is code verification 246 routine, and PR-4 is a second or alternative code verification 248 routine. In the example of FIG. 2, assume that protection routine Code Verification protection category is specified by the manifest. The OS loader picks a protection routine (in this case, PR-4) from the list of protections it has available in the Code Verification category. The PR-4 code verification computer instructions are then available to be included into computer memory 250 along with the binary code from disk 230. Thus, both the binary information 212, 214 and the PR-4 code verification are included 255 into the binary image 252 created in computer memory 250.

The protection mechanism code injected into the computer memory image of the binaries can typically be anti-tamper techniques. For example, an anti-debugging routine can perform checks to prevent someone from debugging and reverse engineering the binary. Also, integrity checks can be injected into the computer memory image to prevent someone from altering the binary in memory. This prevents the introduction of viruses or changed functionality in the binary. Other protections techniques can be created and downloaded to the computer hosting the OS to allow the application of new software protection technologies to the binary.

Note that the manifest 216 specifies the category of protection. The manifest does not list the specific protection routine or mechanism. The loader selects from the routines available in a chosen category when it inserts the protections. Therefore, different instances of an application or instances on different machines can have different protections injected. Note that the protection technologies can be updated separately from the binary itself. For example, the PR collection of protection code 241 is remotely updatable, using a service like Windows™ Update, for example. The service may add new techniques to the collection and remove techniques that have been broken or otherwise compromised. Deployed applications will use the new collection implicitly without needing any modifications in the field.

In one aspect of the invention, the binary image in computer memory may be executed using any of the access methods available in an operating system. For example, loading a CD ROM, as described above, can result in a binary image in computer memory with the protection mechanism code also resident in the computer memory. If a prompt is given to the user as a result of the load, then binary image can be executed. Alternatively, if an application, such as Microsoft® Word™ is in computer memory and a drop down menu to open a file is selected, then the binary image and the protection mechanism will be executed. Other options also exist for executing the binary image in computer memory. For example, an open command or a program call may be used to open binaries that have protection manifests.

In one aspect of the invention, protections routines are either general or targeted. Examples of general PRs include routines that perform functions such as "do not allow file-open access" or routines such as "verify all functions before they're called". Targeted protection routines include functions such as "verify that the binary hasn't changed since it was loaded", or functions such as "check for presence of a debugger". Targeted protections can be injected into the binary image in multiple ways that could be specified in the manifest along with the protection categories. One example technique of injecting the targeted protections include injection at random locations throughout the program. In one embodiment, this can be set as a default injection technique for targeted protection. Another targeted injection technique can be to inject in locations as specified in the manifest. Here, the manifest can include a list of functions and their respective targeted locations. Another targeted injection technique can include injection in locations as specified in run-time profiling data provided by the manifest. Here, functions which are executed most often or least often, for example, can se specified in the manifest.

Returning to the example of FIG. 2, the code verification PR-4 was selected by the OS loader. This protection mechanism was selected to comply with the protection type in the manifest. As such, the code verification protection in the binary image in computer memory will verify any functions that the binary calls before the call is executed. If a "Do not allow file access" protection is injected into the binary image in memory, then standard file operations will not be able to access the protected binary. However, selected non-standard file operations may be able to access the protected binary. Thus, protections can be customized within the OS on a user or computer basis.

Figure 3:
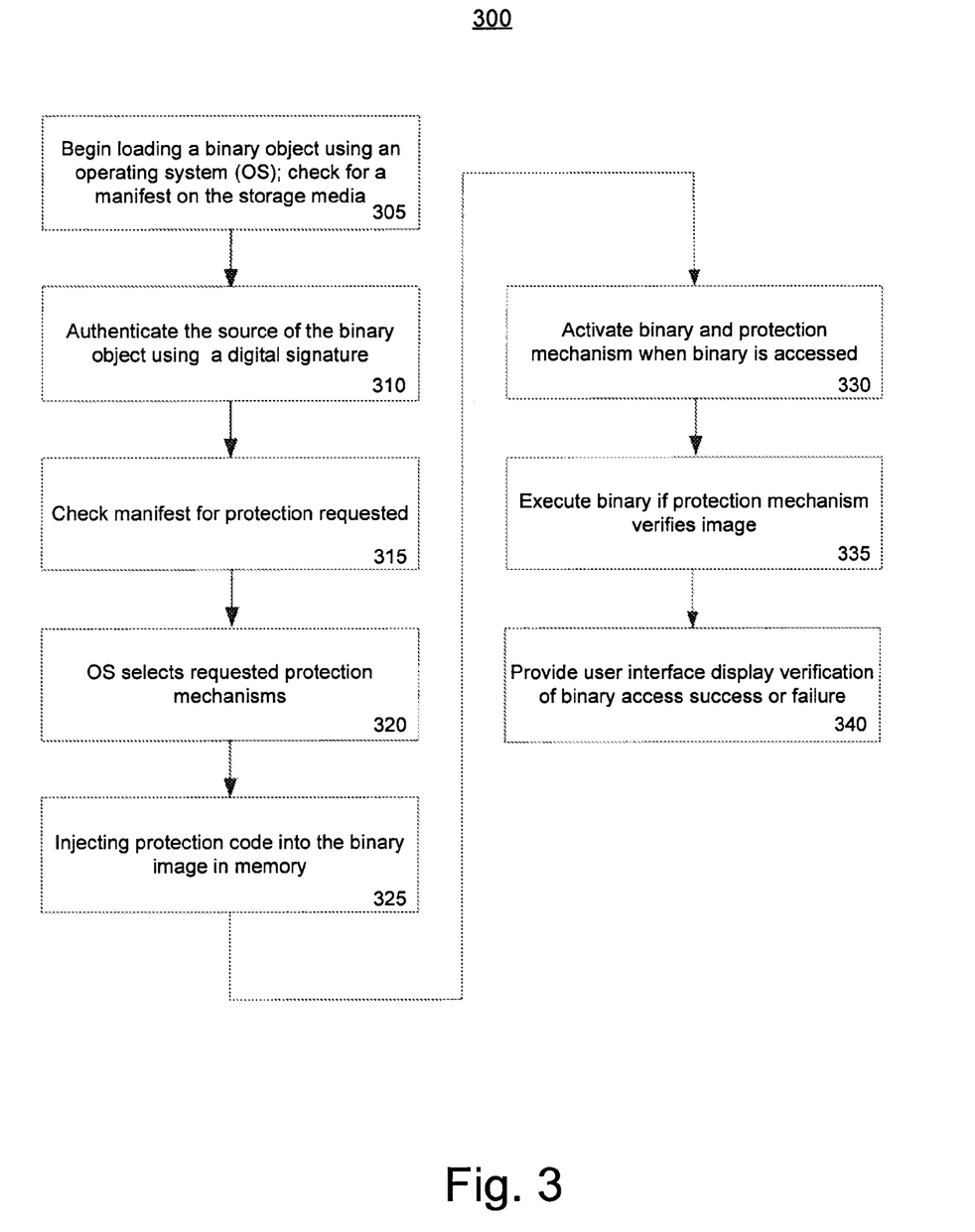
FIG. 3 is an example flow diagram depicting typical events according to aspects of the invention.

FIG. 3 is an example generalized flow diagram of a method 300 that incorporates aspects of the invention. At step 305, a binary object, such as a binary object subject to protection (i.e. binary program code, or binary data, or binary file, etc.), starts to load using an OS loader. The OS loader first checks for the presence of a manifest on the storage media where the binary object, manifest, and digital signature is expected to be found. If a manifest is found, then at step 310, an authentication of the binary object and manifest information is performed using the digital signature also stored on the storage media. The OS may call an authentication module, separate from the OS loader, to perform the authentication. Alternately, the authentication module can be part of the OS loader. As noted above, a digital signature may be present without a manifest. But here, it is assumed that a manifest and a digital signature are present for authentication purposes.

Upon a successful authentication, step 315 is performed to check the manifest for the category or type of protection required by the binary information of the storage media. Once the protection category is retrieved from the manifest, the OS loader can select the protection mechanism via a catalog of protection routines available to the OS at step 320. At step 325, the selected protection code, along with the binary information is injected into computer memory to form a binary image in computer RAM.

When the binary object is accessed via computer RAM, the binary object as well as the protection mechanism are activated in step 330. This activation of both the binary object and the injected protection mechanism is possible because both the binary object and the protection mechanism are loaded together in computer memory. Depending on the specific protection mechanism used, the binary is allowed to be accessed after the protection mechanism performs its verification or checks in step 335. For example, if the binary object is a data file object, or if the binary object is an executable program object, the binary object is accessed if the verification of the protection mechanism is successful. Finally, the computer system user, either a person or a software entity is provided a verification that the protection mechanism is successfully performing its function. For example, at step 340, a person (user) can see a display indication the binary object (data, program, etc.) is accessed or not based on the result of execution of the protection mechanism injected into the image file in computer memory. For example, should the protection mechanism fail to verify that the binary image is a valid (i.e. the binary object is modified, an unauthorized copy, outdated, incompatible, etc), then the binary object would not be fully executed and a message would be displayed on a user interface indicating the failure and denying access to the binary object. Alternately, upon the success of the protection mechanism to verify the binary object is valid (compatible, authorized, un-tampered, etc), then the binary object opens and the user understands that access to the object has been granted via the protection mechanism.

Exemplary Computing Device

Figure 4:
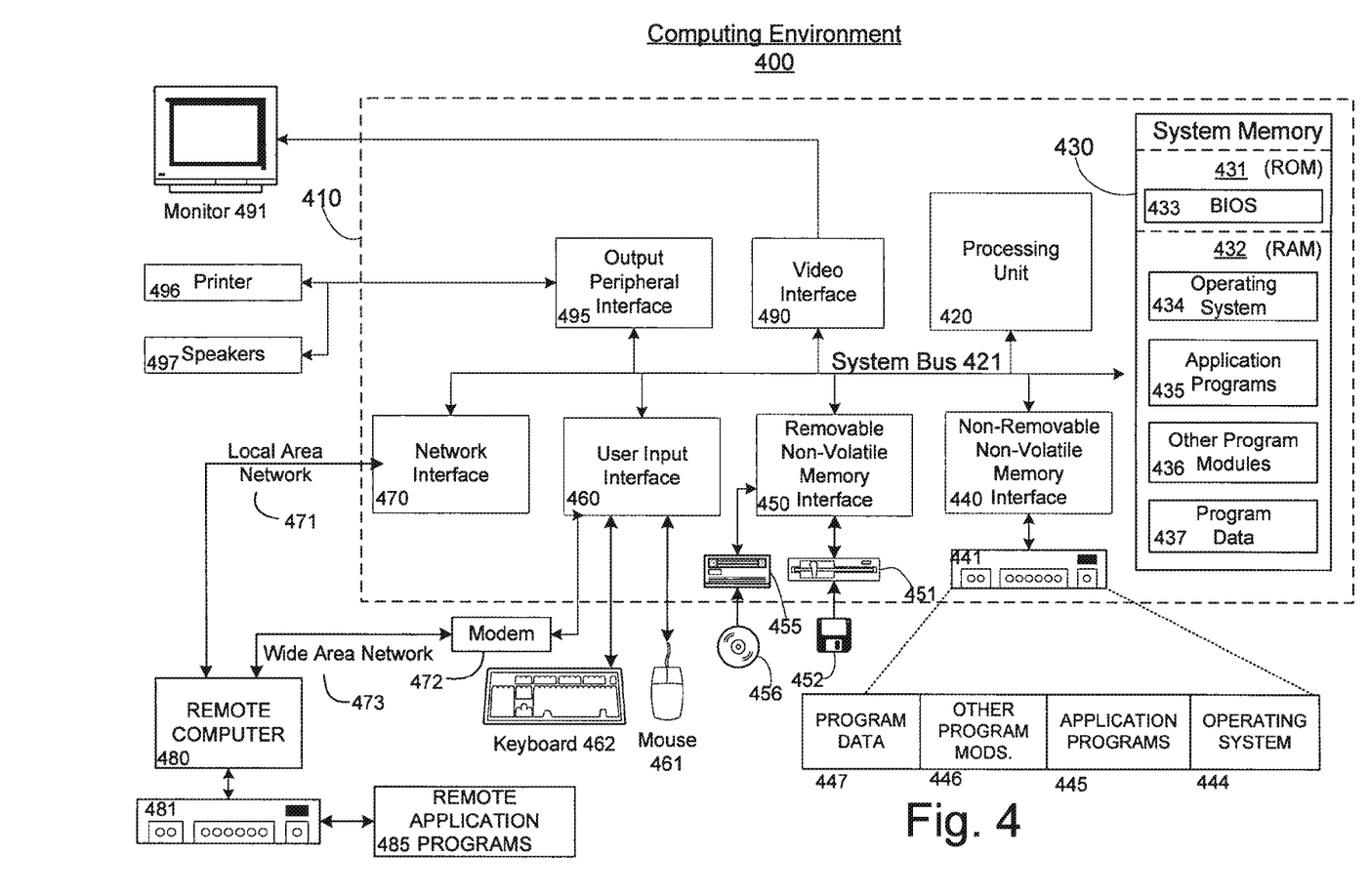
FIG. 4 is a block diagram showing an example host computing environment in which aspects of the invention may be implemented.

FIG. 4 and the following discussion are intended to provide a brief general description of host computer suitable for interfacing with the media storage device. While a general purpose computer is described below, this is but one single processor example, and embodiments of the host computer with multiple processors may be implemented with other computing devices, such as a client having network/bus interoperability and interaction.

Although not required, embodiments of the invention can also be implemented via an operating system, for use by a developer of services for a device or object, and/or included within application software. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that various embodiments of the invention may be practiced with other computer configurations. Other well known computing systems, environments, and/or configurations that may be suitable for use include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. Embodiments of the invention may also be practiced in distributed computing environments where tasks are performed by remote processing devices that are linked through a communications network/bus or other data transmission medium. In a distributed computing environment, program modules may be located in both local and remote computer storage media including memory storage devices and client nodes may in turn behave as server nodes.

With reference to FIG. 4, an exemplary system for implementing an example host computer includes a general purpose computing device in the form of a computer system 410. Components of computer system 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures.

Computer system 410 typically includes a variety of computer readable media. Computer readable media can be any available media that can be accessed by computer system 410 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, Random Access Memory (RAM), Read Only Memory (ROM), Electrically Erasable Programmable Read Only Memory (EEPROM), flash memory or other memory technology, Compact Disk Read Only Memory (CDROM), compact disc-rewritable (CDRW), digital versatile disks (DVD) or other optical disk storage, magnetic cassettes, magnetic tape, magnetic disk storage or other magnetic storage devices, or any other medium which can be used to store the desired information and which can accessed by computer system 410.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer system 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 433, application programs 435, other program modules 436, and program data 437.

The computer system 410 may also include other removable/non-removable, volatile/nonvolatile computer storage media. By way of example only, FIG. 4 illustrates a hard disk drive 431 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456, such as a CD ROM, CDRW, DVD, or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 4 provide storage of computer readable instructions, data structures, program modules and other data for the computer system 410. In FIG. 4, for example, hard disk drive 441 is illustrated as storing operating system 444, application programs 445, other program modules 446, and program data 447. Note that these components can either be the same as or different from operating system 444, application programs 445, other program modules 446, and program data 447. Operating system 444, application programs 445, other program modules 446, and program data 447 are given different numbers here to illustrate that, at a minimum, they are different copies.

A user may enter commands and information into the computer system 410 through input devices such as a keyboard 462 and pointing device 461, commonly referred to as a mouse, trackball or touch pad. Other input devices (not shown) may include a microphone, joystick, game pad, satellite dish, scanner, or the like. These and other input devices are often connected to the processing unit 420 through a user input interface 460 that is coupled to the system bus 421, but may be connected by other interface and bus structures, such as a parallel port, game port or a universal serial bus (USB). A monitor 491 or other type of display device is also connected to the system bus 421 via an interface, such as a video interface 490, which may in turn communicate with video memory (not shown). In addition to monitor 491, computer systems may also include other peripheral output devices such as speakers 497 and printer 496, which may be connected through an output peripheral interface 495.

The computer system 410 may operate in a networked or distributed environment using logical connections to one or more remote computers, such as a remote computer 480. The remote computer 480 may be a personal computer, a server, a router, a network PC, a peer device or other common network node, and typically includes many or all of the elements described above relative to the computer system 410, although only a memory storage device 481 has been illustrated in FIG. 4. The logical connections depicted in FIG. 4 include a local area network (LAN) 471 and a wide area network (WAN) 473, but may also include other networks/buses. Such networking environments are commonplace in homes, offices, enterprise-wide computer networks, intranets and the Internet.

When used in a LAN networking environment, the computer system 410 is connected to the LAN 471 through a network interface or adapter 470. When used in a WAN networking environment, the computer system 410 typically includes a modem 472 or other means for establishing communications over the WAN 473, such as the Internet. The modem 472, which may be internal or external, may be connected to the system bus 421 via the user input interface 460, or other appropriate mechanism. In a networked environment, program modules depicted relative to the computer system 410, or portions thereof, may be stored in the remote memory storage device. By way of example, and not limitation, FIG. 4 illustrates remote application programs 485 as residing on memory device 481. It will be appreciated that the network connections shown are exemplary and other means of establishing a communications link between the computers may be used.

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s .NET™ platform, available from MICROSOFT Corporation, includes servers, building-block services, such as Web-based data storage, and downloadable device software. While exemplary embodiments herein are described in connection with software residing on a computing device, one or more portions of an embodiment of the invention may also be implemented via an operating system, application programming interface (API) or a "middle man" object between any of a coprocessor, a display device and a requesting object, such that operation may be performed by, supported in or accessed via all of .NET™'s languages and services, and in other distributed computing frameworks as well.

As mentioned above, while exemplary embodiments of the invention have been described in connection with various computing devices and network architectures, the underlying concepts may be applied to any computing device or system in which it is desirable to implement a method for implementing a protection mechanism for binary information on a storage device. Thus, the methods and systems described in connection with embodiments of the present invention may be applied to a variety of applications and devices. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent systems and methods achieved by embodiments of the invention.

The various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention.

While aspects of the present invention has been described in connection with the preferred embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the claimed invention should not be limited to any single embodiment, but rather should be construed in breadth and scope in accordance with the appended claims.

What is claimed is:

1. A computer-implemented method to apply a protection mechanism to a binary object, the method comprising:
   using an operating system loading mechanism to check a storage medium for the presence of a manifest, the storage medium containing the binary object, the manifest, and a digital signature over the binary object and the manifest;
   authenticating the binary object and the manifest using the digital signature;
   reading the manifest for a protection type;
   selecting, by the operating system, one of a plurality of available protection mechanisms corresponding to the protection type of the manifest;
   loading the binary object from the storage medium into computer memory while injecting code corresponding to the selected protection mechanism to form a binary image of the combination of binary object and injected code corresponding to the selected protection mechanism in computer memory;
   executing the binary image, wherein proper functionality of the binary object is controlled by the injected code corresponding to the selected protection mechanism;
   displaying results of execution of the selected protection mechanism and granting full functionality to the binary object if permitted by the selected protection mechanism.

2. The method of claim 1, wherein the selected protection mechanism is updated periodically.

3. The method of claim 1, wherein reading the manifest for a protection type comprises reading the manifest for one of a group consisting of anti-debugging, call verification, program integrity checks, system integrity checks, license verifications, server inquiries, and access permissions.

4. The method of claim 1, wherein selecting, by the operating system, one of a plurality of available protection mechanisms comprises selecting code, wherein the code includes a plurality of routines to be executed along with the binary object.

5. The method of claim 1, further comprising:
   displaying results of execution of the selected protection mechanism and denying access to the binary object if indicated by the selected protection mechanism.

6. The method of claim 1, wherein executing the binary image includes executing the injected code corresponding to the selected protection mechanism each time the binary image is executed.

7. The method of claim 6, wherein the injected code corresponding to the selected protection mechanism is changed based upon an update of the selected protection mechanism, wherein the update comprises one of a group consisting of a revocation of the selected protection mechanism and a new protection mechanism.

8. The method of claim 7, wherein the update of the selected protection mechanism causes the injected code corresponding to the selected protection mechanism to prevent functionality of the binary object.

9. The method of claim 1, wherein displaying results of execution of the selected protection mechanism comprises displaying an indication that the binary object remains fully functional and accessible to a user after execution of the injected code corresponding to the selected protection mechanism.

10. A computer system for applying a protection mechanism to a binary object during run time, the system comprising:
    a computer-readable storage media interface;
    computer memory;
    an operating system having program code to apply the protection mechanism to a binary object;
    a processor for executing the program code, wherein the program code directs the computer system to perform the functions comprising:
    using a loader function of the operating system to check a storage medium for the presence of a manifest, the storage medium containing the binary object, the manifest, and a digital signature over the binary object and the manifest;
    using an authentication function of the operating system to authenticate the binary object and the manifest using the digital signature;
    reading the manifest for a protection type;
    selecting, by the operating system, one of a plurality of available protection mechanisms corresponding to the protection type of the manifest;
    using a loader function to load the binary object from the storage medium into the computer memory while injecting code corresponding to the selected protection mechanism to form a binary image of the combination of binary object and injected code corresponding to the selected protection mechanism in the computer memory;
    using an execution function of the operating system, executing the binary image, wherein proper functionality of the binary object is controlled by the injected code corresponding to the selected protection mechanism.

11. The computer system of claim 10, further comprising a display for indicating the functionality status of the binary object during run-time of the binary object.

12. The computer system of claim 10, wherein the computer memory comprises one or more of computer system random access memory and on-chip processor random access memory.

13. The computer system of claim 10, wherein the protection type is one of the group comprising anti-debugging, call verification, program integrity checks, system integrity checks, license verifications, server inquiries, and access control means.

14. The computer system of claim 10, wherein the binary image that includes the injected code corresponding to the selected protection mechanism is generated at every instance of execution of the binary object, wherein the injected code corresponding to the selected protection mechanism is executed each time the binary object is accessed for execution.

15. A computer-readable storage medium having computer-executable instructions for applying a protection mechanism to a binary object wherein the computer-readable storage medium is not a signal, the instructions comprising:
    using an operating system loader to check a storage medium for the presence of a manifest, the storage medium containing the binary object, the manifest, and a digital signature over the binary object and the manifest;
    authenticating the binary object and the manifest using the digital signature;
    reading the manifest for a protection type;
    selecting, by the operating system, one of a plurality of available protection mechanisms corresponding to the protection type of the manifest;
    loading the binary object from the storage medium into computer memory while injecting code corresponding to the selected protection mechanism to form a binary image of the combination of binary object and injected code corresponding to the selected protection mechanism in computer memory;
    wherein, during execution of the binary image, proper functionality of the binary object is controlled by the injected code corresponding to the selected protection mechanism, and wherein a status of the binary object is displayed after execution of the injected code.

16. The computer-readable storage medium of claim 15, wherein the instruction for reading the manifest for a protection type comprises reading the manifest for one a group consisting of anti-debugging, call verification, program integrity checks, system integrity checks, license verifications, server inquiries, and access permissions.

17. The computer-readable storage medium of claim 15, further comprising:
    accepting updates to the selected protection mechanism.

18. The computer-readable storage medium of claim 17, wherein the update of the selected protection mechanism causes the injected code corresponding to the selected protection mechanism to prevent functionality of the binary object if the selected protection mechanism verified that the binary object did not pass a verification test.

* * * * *